United States Patent
Berry et al.

(10) Patent No.: US 12,244,553 B2
(45) Date of Patent: Mar. 4, 2025

(54) SYSTEM FOR IDENTIFYING AND BLOCKING SUSPECT ELECTRONIC COMMUNICATIONS BASED ON ARTIFICIAL INTELLIGENCE

(71) Applicant: BANK OF AMERICA CORPORATION, Charlotte, NC (US)

(72) Inventors: Anna Kristen Pingel Berry, Indian Land, SC (US); Shweta Ambulkar, Plainsboro, NJ (US); Benjamin Daniel Hardman, Harrisburg, NC (US); Angela Ianni, Lincoln, RI (US); Olga Kocharyan, Matthews, NC (US); Luqman Sharief, Libertyville, IL (US); Michael Wm. Whitaker, Fort Worth, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 264 days.

(21) Appl. No.: 17/838,978

(22) Filed: Jun. 13, 2022

(65) Prior Publication Data

US 2023/0403247 A1    Dec. 14, 2023

(51) Int. Cl.
  *H04L 51/212*   (2022.01)
  *H04L 9/40*     (2022.01)
  *H04L 51/08*    (2022.01)
  *H04L 51/42*    (2022.01)

(52) U.S. Cl.
  CPC ............ *H04L 51/212* (2022.05); *H04L 51/08* (2013.01); *H04L 51/42* (2022.05); *H04L 63/1408* (2013.01); *H04L 63/1441* (2013.01)

(58) Field of Classification Search
  CPC ....... H04L 51/08; H04L 51/212; H04L 51/42; H04L 63/1408; H04L 63/1441; H04L 63/1483; H04L 51/214; H04L 51/48
  See application file for complete search history.

(56) References Cited

U.S. PATENT DOCUMENTS

| | | | |
|---|---|---|---|
| 8,131,655 B1* | 3/2012 | Cosoi | G06N 3/045 |
| | | | 706/12 |
| 8,201,254 B1 | 6/2012 | Wilhelm et al. | |
| 9,774,625 B2 | 9/2017 | Yeh et al. | |
| 9,923,909 B2 | 3/2018 | Lietz et al. | |
| 10,009,358 B1* | 6/2018 | Xie | G06F 21/552 |
| 10,511,628 B1* | 12/2019 | Richards | G06F 16/9566 |
| 10,757,120 B1 | 8/2020 | Aziz et al. | |

(Continued)

*Primary Examiner* — Greg C Bengzon
(74) *Attorney, Agent, or Firm* — Moore & Van Allen PLLC; Nicholas C. Russell

(57) ABSTRACT

Implementing artificial intelligence, specifically, machine learning techniques to identify malicious emails and, in response, identifying and conducting actions, including reporting the malicious emails to identified internal and/or external entities and preventing the malicious emails from being delivered to email client mailboxes. The machine learning techniques rely on malicious email patterns identified, at least, from previously identified malicious emails and data resulting from continuously crawling the Web and threat intelligence sources. Further, the email clients may be configured to include an add-on feature in which the user can provide a single input to report the email as being suspicious, which results in further analysis to determine whether the email is, in fact, a malicious email.

14 Claims, 5 Drawing Sheets

(56) References Cited

U.S. PATENT DOCUMENTS

| | | |
|---|---|---|
| 10,834,111 B2 | 11/2020 | Adir et al. |
| 11,146,575 B2 | 10/2021 | Higbee et al. |
| 11,184,341 B2 | 11/2021 | Mityagin |
| 11,336,669 B2 | 5/2022 | Bazalgette et al. |
| 11,343,276 B2 | 5/2022 | Edwards et al. |
| 11,431,747 B2 | 8/2022 | Irimie et al. |
| 11,477,222 B2 | 10/2022 | Dunn et al. |
| 11,489,868 B2 | 11/2022 | Grealish |
| 11,973,772 B2 * | 4/2024 | Jeyakumar .......... H04L 63/1416 |
| 2014/0201836 A1 | 7/2014 | Amsler |
| 2016/0012223 A1 * | 1/2016 | Srivastava .......... H04L 63/1425 726/23 |
| 2016/0119373 A1 | 4/2016 | Fausto et al. |
| 2016/0149943 A1 * | 5/2016 | Kaloroumakis .... H04L 63/1425 726/23 |
| 2019/0028510 A1 * | 1/2019 | Celik .................... H04L 51/046 |
| 2020/0067861 A1 * | 2/2020 | Leddy ................ G06F 21/6245 |
| 2020/0304528 A1 | 9/2020 | Ackerman et al. |
| 2020/0396258 A1 | 12/2020 | Jeyakumar ............. G06N 20/00 |
| 2021/0021612 A1 * | 1/2021 | Higbee ............... H04L 63/1416 |
| 2021/0248229 A1 * | 8/2021 | Kras ....................... H04L 51/08 |
| 2021/0352093 A1 * | 11/2021 | Hassanzadeh ...... H04L 63/1416 |
| 2022/0394047 A1 * | 12/2022 | Lee ....................... H04L 63/145 |
| 2023/0007042 A1 * | 1/2023 | Haworth ............... H04L 63/205 |

\* cited by examiner

SYSTEM FOR IDENTIFYING AND BLOCKING SUSPECT ELECTRONIC COMMUNICATIONS BASED ON ARTIFICIAL INTELLIGENCE

FIELD OF THE INVENTION

The present invention is related to email security and, more specifically, leveraging Artificial Intelligence (AI) including Machine Learning (ML) to customizably identify, block and report emails with malicious intent (i.e., emails attempt to wrongfully obtain data from the email recipient or the device and/or network on which the email is received).

BACKGROUND

Most current systems for detecting and filtering malicious emails are generally reactive in nature. In this regard, the current systems receive notification of an existing email threat from a software/antivirus service and, in response, conditions are manually defined by the user within the systems to prevent those emails that meet the conditions (i.e., pose the threat) from reaching the intending email recipient's mailbox. However, such systems do not operate in real-time, in that, typically a minimum of a one-to-two day lag period exists between when a threat is detected and when notifications are communicated to downstream email protections systems. Further delays may occur if conditions are not immediately defined within the protections systems to address the threat.

In addition, current systems take a global approach to detection and filtering malicious emails and, as such, do not account for the fact that threat tolerances vary from industry-to-industry or, even on a more granular level, in large enterprises from division/sector-to-division/sector. In this regard, different sectors within a single email address domain (i.e., single enterprise or the like) may have different levels of tolerance for malicious email threats. However, current global-based systems which do not account for the granular-level variances in an enterprise's or sub-enterprise's tolerance of such threats.

Moreover, even the most effective systems for detecting and filtering malicious emails are not infallible. This means that it is inevitable that a small percentage of emails that are malicious or appear to the user/email recipient as suspicious will make their way to a user's/email recipient's inbox. This is especially true if the system user is willing to incur a higher level of tolerance that a seemingly suspect email is not an actual malicious email. Currently known malicious email detection and filters have minimal or no means for the user/email recipient to report an email they view to be suspect or malicious. Typically, the only avenue for the user/email recipient is to send an email to their respective Information Technology (IT) personnel, who may or may not result in further mitigation action being taken.

Therefore, a need exists to develop systems, methods, computer program products and the like that would proactively identify malicious email. In this regard, the desired systems, methods, computer program products and the like should be capable of identifying a so-called zero-day attack (i.e., a vulnerability that is unknown to a software or antivirus provider). In addition, the desired systems, methods, computer program products and the like should be highly configurable by the user to allow for significant granularity in terms of the level of tolerance that groups of email recipients for suspect emails. Moreover, the desired systems, methods, computer program products and the like should account for the fact that by allowing for various tolerance levels in terms of suspicious emails, a certain percentage of emails that are suspicious or malicious will make there way to an email recipients mailbox. In this regard, systems, methods, computer program products should not only provide for a simplified and efficient means by which email recipients can report suspicious emails, but also a means for further automated analysis of the suspect emails to determine if the suspect emails are, in fact, malicious emails.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by implementing Artificial Intelligence (AI), specifically Machine Learning (ML) techniques to identify malicious emails and prevent such emails from being delivered to the intended recipient's mailbox. In this regard, ML techniques are used to learn, over-time, malicious email patterns based at least one (i) previously identified malicious emails, including in some embodiments identifying the source and/or physical location of the previously identified malicious email, (ii) continuously crawling the Web to identify any data that is relevant to the identification of malicious email patterns and, and (iii) feeds from threat intelligence sources. In specific embodiments of the invention, the analysis of the emails further includes comparing (i) any Universal resource Locators (URLs) embedded in the emails to known malicious or compromised locations and/or (ii) signatures (e.g., senders' address, Internet Protocol (IP) address, subject line and structure/format) of the received email to known malicious email vectors. In further specific embodiments of the invention, the analysis of the emails further includes comprehending text in the body of the email to determine the tone and/or urgency of the sender and/or identify a known malicious email pattern.

In specific embodiments of the analysis of emails to identity malicious emails provides for rendering a malicious email indicator score or level. In such embodiments of the invention, the controlling entity may define differing score thresholds to identify emails that are suspicious (i.e., unconfirmed as being malicious) or malicious. In this regard, a lower threshold may be set for identifying a suspicious email, which may be required to definitively determine whether or not the email is indeed malicious, while a higher threshold may be set for identifying a malicious email. In addition, the score thresholds are highly configurable such that controlling entities can adjust the thresholds on demand or for vary the thresholds for defined groups of email recipients.

In other specific embodiments of the invention, the ML techniques are relied upon to determine, for each identified malicious emails, the actions to be taken in terms of reporting, both internally and/or externally, the occurrence of the malicious email and mitigating further occurrences of the same or similar malicious emails. Moreover, the AI is able to manage the actions, including, but not limited to, generating and initiating communication of reports, retracting previously delivered similar or same emails and the like. Moreover, in those embodiments in which a malicious email indicator threshold is determined, the score thresholds may be determinative as to what actions are taken in response to identifying a suspicious or malicious email.

In additional specific embodiments of the invention, the email clients are configured with an add-on feature that allows for single user input (i.e., "one-click) reporting of emails received by a user that are perceived to be suspicious. The reporting of such emails feeds directly back to the AI/ML where further analysis can be performed on such emails to definitively determine whether or not the suspicious email is a malicious email. If the email is determined to be malicious, the AI/ML may determine the necessity for further actions, such as determining who to report the malicious email to, if the email was delivered to other email recipient mailboxes, whether the recipient performed actions of the email, determining actions to be taken to ensure that further emails from the source are not received/delivered, actions to attempt to retract the same email from other email recipient mailboxes and the like. Moreover, if the email is determined to be malicious, the AI/ML may determine why the email was not initially determined to be malicious and implement steps to prevent such oversight in the future (i.e., self-correct).

A system for electronic mail (email) management defines first embodiments of the invention. The system includes a plurality of email clients. Each email client being associated with one of a plurality of users and including an electronic mailbox that is configured to allow a corresponding user to access email associated with one or more email accounts held by the corresponding user. The system additionally includes a gateway apparatus having a memory and one or more processing devices in communication with the memory. The memory stores an artificial intelligence-based (AI-based) email management tool that implements Machine Learning techniques. The email management tool is executable by at least one of the processing devices. The email management tool is configured to learn, over-time, malicious email patterns from (i) malicious emails previously identified by the email management tool, (ii) continuously crawling the Web to identify data relevant to learning malicious email patterns, and (iii) feeds from threat intelligence sources. The email management tool is further configured to receive email addressed to the plurality of users, and, prior to delivering the email to the electronic mailboxes of the email clients, analyze the received email by, at least, applying the malicious email patterns to identify malicious email (i.e., email that attempts to wrongfully obtain data). In response to identifying malicious email, the email management tool is configured to prevent/block the malicious email from being delivered to the electronic mailbox of the corresponding one of the plurality of users.

In specific embodiments of the system, the email management tool is further configured to, for each identified malicious email, implement AI/ML to determine one or more first actions to be taken in response to the identification of the malicious email. The one or more first actions include, but are not limited to, (i) determining one or more internal and/or external entities for reporting the identification of the malicious email and, in specific embodiments of the system (ii) feeding data associated with the malicious email back into the email management tool, and (iii) blocking future emails from the sender from being received at the gateway apparatus. In response to determining the actions, the email management tool is further configured to manage occurrence of the one or more first actions including generating and initiating communication of reports to the determined one or more entities.

In other specific embodiments of the system, the plurality of email clients are configured with an email reporting add-on feature that is configured to allow for a single user input (i.e., "one-click" feature) for reporting a suspicious email (i.e., an email that an email recipient perceives to be attempting to wrongfully obtain data) to the email management tool. In related embodiments of the system, the email management tool is further configured to implement machine learning techniques to further analyze the identified suspicious email to determine whether the suspicious email is a verified malicious email. In further related embodiments of the system, the email management tool is further configured to, in response to determining that the identified suspicious email is a verified malicious email, implement machine learning techniques to determine one or more reasons why the malicious email was not identified as malicious prior to communicating the email to the electronic mailbox of the email client and take preventive measures to ensure that such omission does not occur in the future (i.e., self-correct). In further related embodiments of the system, the email management tool is further configured to implement machine learning techniques to determine one or more second actions to be taken in response to determining that the identified suspicious email is the verified malicious email. The second actions include, but are not limited to, (i) determining one or more entities for reporting the identification of the suspicious email, and determining which other electronic mailboxes received emails with similar signatures to the verified malicious email and, in response, and (ii) attempt to replace the emails determined to have similar signatures with an email notification that indicates that the emails determined to have similar signatures are being held for further analysis.

In further specific embodiments of the system, the email management tool is further configured to the analyze the received email to determine whether received email are suspicious email (i.e., email that may be attempting to wrongfully obtain data from the email recipient) and, in response to determining that one or more email are suspicious email, conduct additional analysis to identify malicious email (i.e., determine whether the suspicious email are malicious email).

In other specific embodiments of the system, the email management tool is further configured to analyze the received email to identify malicious email by comparing (i) any Universal Resource Locators (URLs) embedded in the email to known malicious or compromised locations and/or (ii) signatures of a received email to known malicious email vectors, wherein the signatures include email sender address, Internet Protocol (IP) address, subject line, and structure or format of the email. In other specific embodiments of the system, the email management tool is further configured to analyze the received email to identify malicious email by comprehending text of a body of the received email to (i) determine at least one of a tone or an urgency of a sender of the received email and/or (ii) identify at least one of the known malicious email patterns.

In still further specific embodiments of the system, the email management tool is further configured to learn, over-time, malicious email patterns by determining a source (i.e., the true identity of the email sender) and/or physical location of the source of the malicious emails previously identified by the email management tool.

Moreover, in additional specific embodiments of the system, the email management tool is further configured to analyze the received email to render a malicious email indicator score, with the score being used to identify received emails as malicious emails based on a predetermined malicious email indicator score threshold. In related embodiments of the system, the email management tool is further configured to determine the one or more first actions to be taken in response to the identification of the malicious email based on the malicious email indicator score. In further related embodiments of the system, the email management tool is further configured to determine whether received email are suspicious email based on the malicious email indicator score and, in response to determining that one or more email are suspicious email, conduct additional analysis to determine whether the suspicious email are malicious email. In this regard a first lower threshold is set for determining that email are suspicious and a higher threshold is set for determining that an email is malicious.

A computer-implemented method for electronic mail (email) management defines second embodiments of the invention. The computer-implemented method is executed by one or more computing processor devices. The computer-implemented method includes implementing machine-learning techniques to learn, over-time, malicious email patterns from (i) previously identified malicious emails, (ii) continuously crawling the World Wide Web to identify data relevant to learning malicious email patterns and (iii) feeds from threat intelligence sources. The computer-implemented method further includes receiving email addressed to a plurality of users and, prior to delivering the email to the electronic mailboxes of the email clients, analyzing the received email by, at least, applying the malicious email patterns to identify malicious email (i.e., email that attempts to wrongfully obtain data). In response to identifying malicious email, the method further includes preventing/blocking the malicious email from being delivered to the electronic mailbox of the corresponding one of the plurality of users.

In specific embodiments the computer-implemented method further includes, for each identified malicious email, further implementing machine-learning techniques to determine one or more first actions to be taken in response to the identification of the malicious email. The first actions include (i) determining one or more internal and/or external entities for reporting the identification of the malicious email and, in specific embodiments of the system (ii) feeding data associated with the malicious email back into the email management tool, and (iii) blocking future emails from the sender from being received at the gateway apparatus. In addition, the computer-implemented method further includes managing occurrence of the one or more first actions including generating and initiating communication of reports to the determined one or more entities.

A computer program product including a non-transitory computer-readable medium defines third embodiments of the invention. The computer readable medium includes sets of codes. The sets of codes cause one or more computing processing devices to implement machine-learning techniques to learn, over-time, malicious email patterns from (i) previously identified malicious emails, (ii) continuously crawling the World Wide Web to identify data relevant to learning malicious email patterns, and (iii) feeds from threat intelligence sources. The sets of codes further cause the computing processor device(s) to receive email addressed to a plurality of users and, prior to delivering the email to the electronic mailboxes of the email clients, analyze the received email by, at least, applying the malicious email patterns to identify malicious email (i.e., email that attempts to wrongfully obtain data). Further, the sets of codes cause the cutting processor device(s) to prevent/block the malicious email from being delivered to the electronic mailbox of the corresponding one of the plurality of users.

Thus, according to embodiments of the invention, which will be discussed in greater detail below, the present invention provides for implementing machine learning (ML) techniques to identify malicious emails and, in response, identifying and conducting actions, including reporting the malicious emails to identified internal and/or external entities and preventing the malicious emails from being delivered to email client mailboxes. The ML techniques rely on malicious email patterns identified from previously identified malicious emails and data resulting from continuously crawling the Web and known threat intelligence sources. Further embodiments of the invention provide for the email clients to include an add-on feature in which the user can provide a single input to report the email as being suspicious, which results in further analysis to determine whether the email is, in fact, a malicious email. In response to determining that a reported suspicious email is malicious, the AI/ML is implemented to determine why the email initially was delivered to the email recipient and provides corrective actions to eliminate or less the possibility of future similar oversights.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
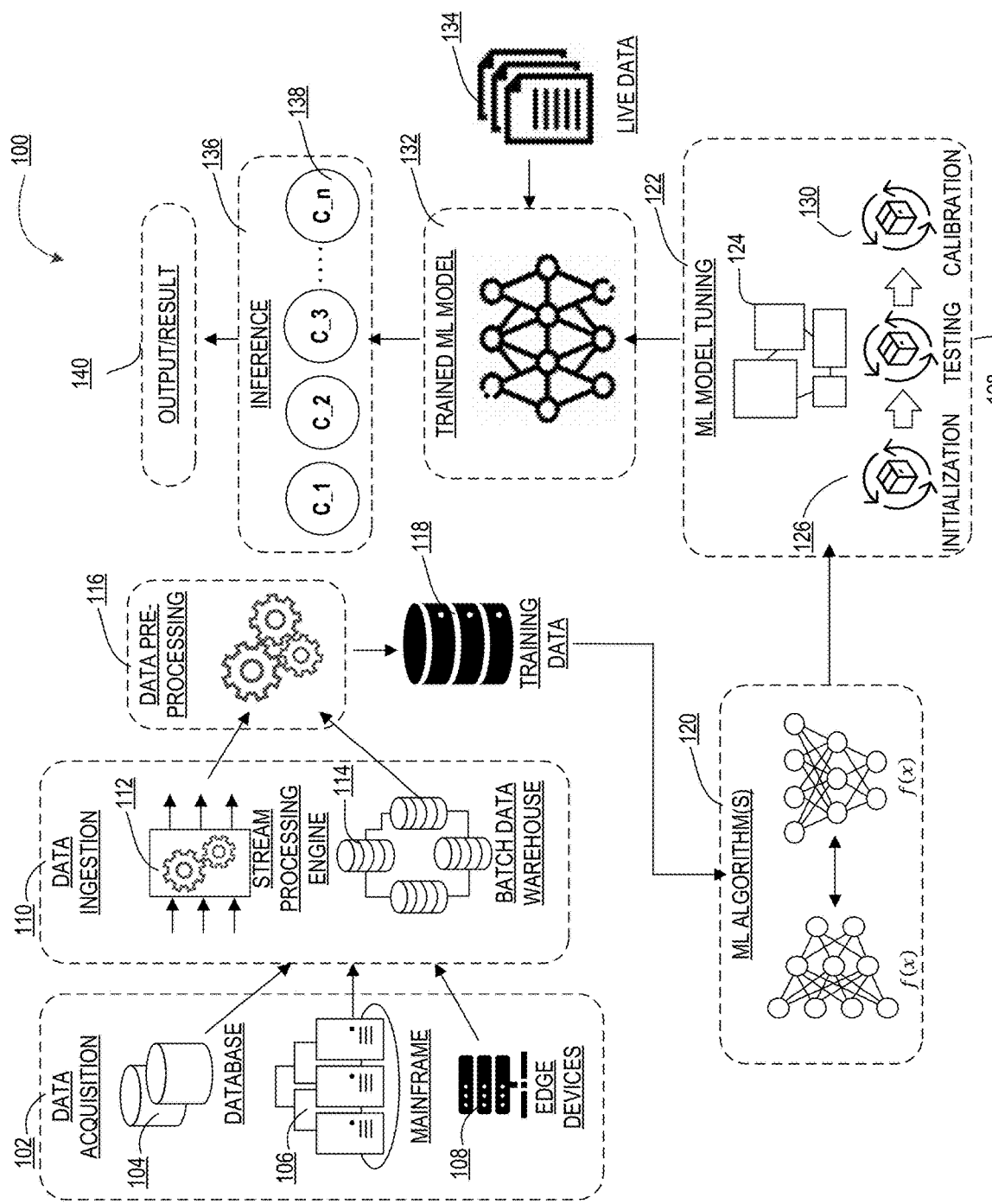
Figure 2:
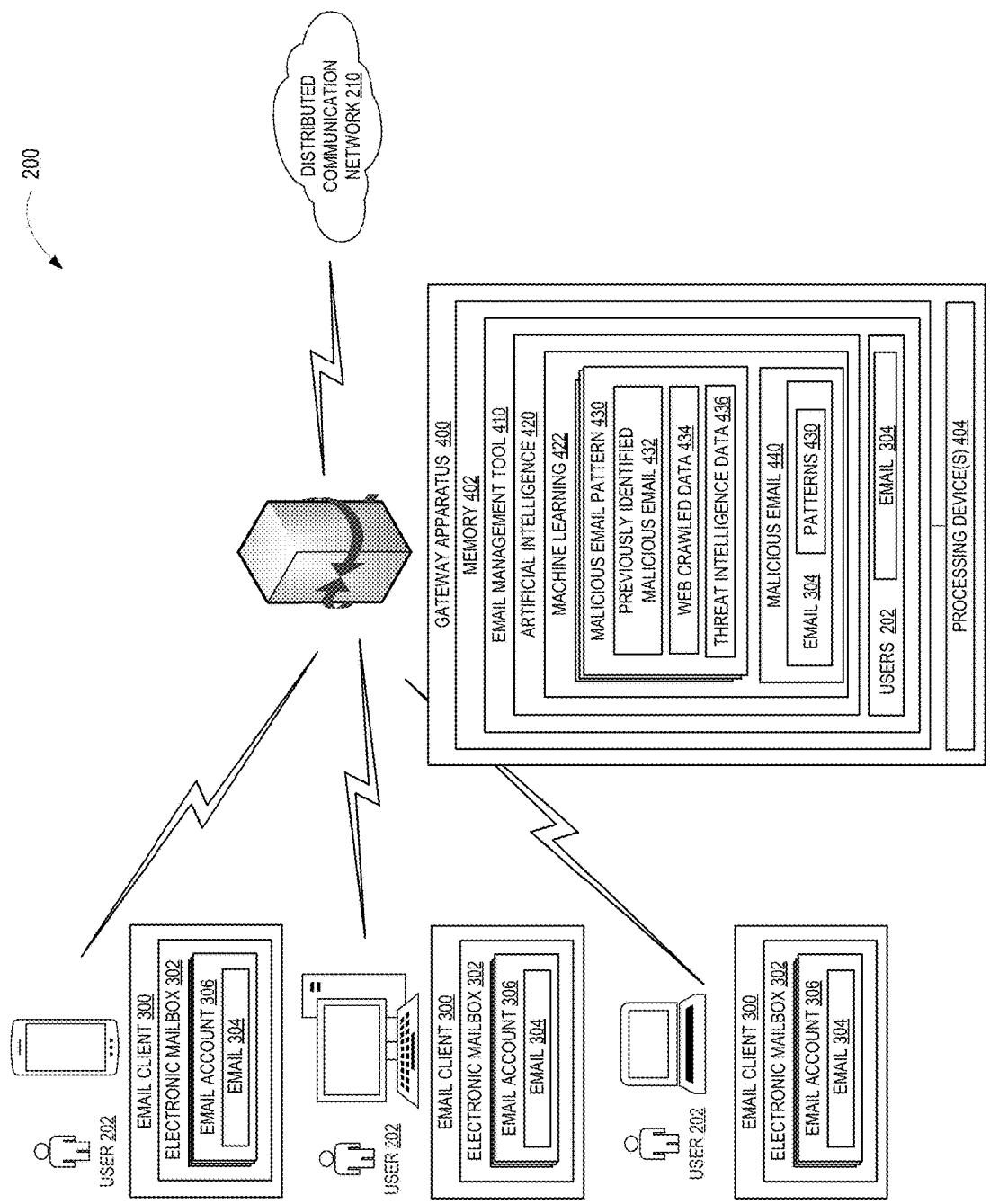
Figure 3:
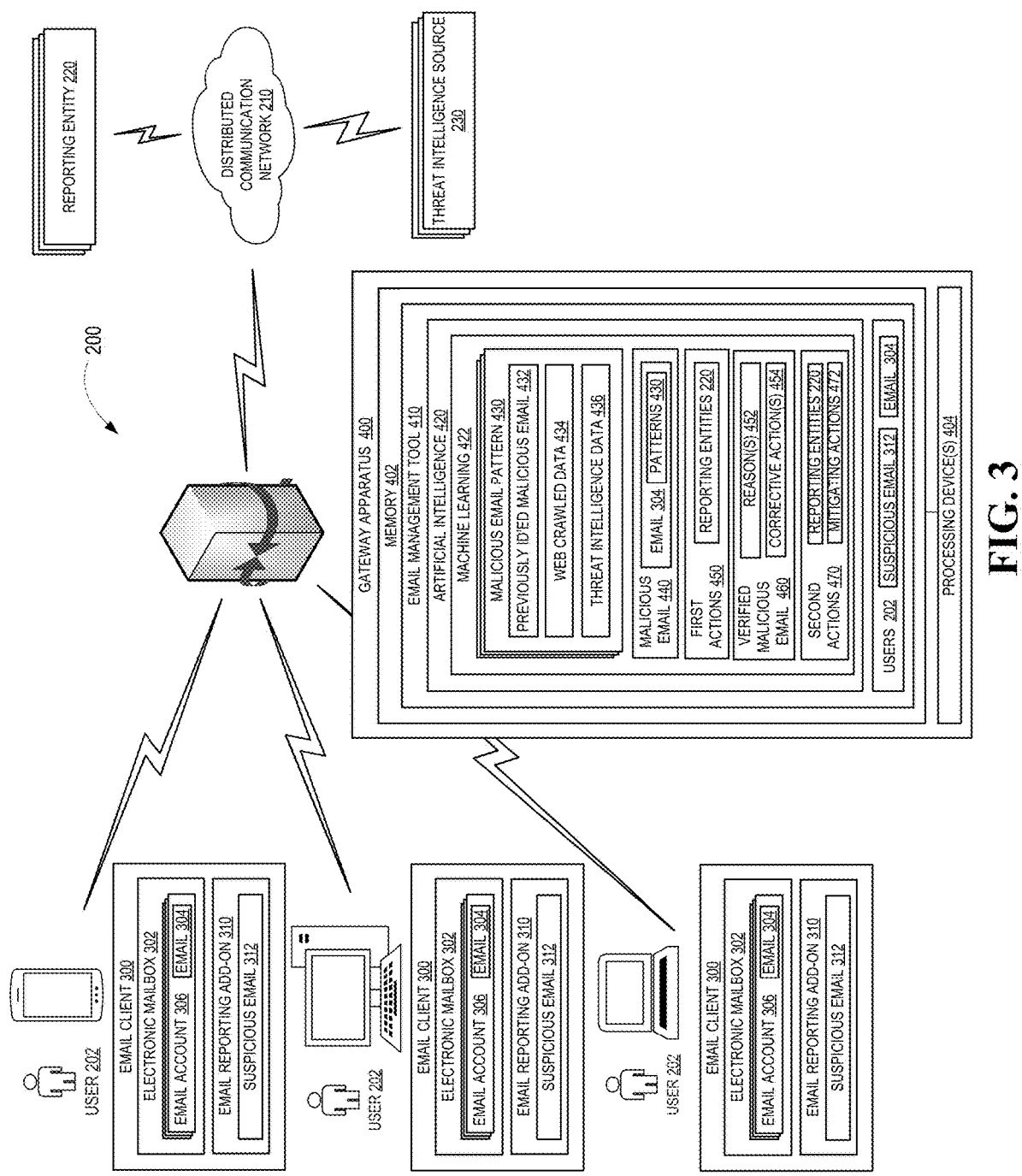
Figure 4:
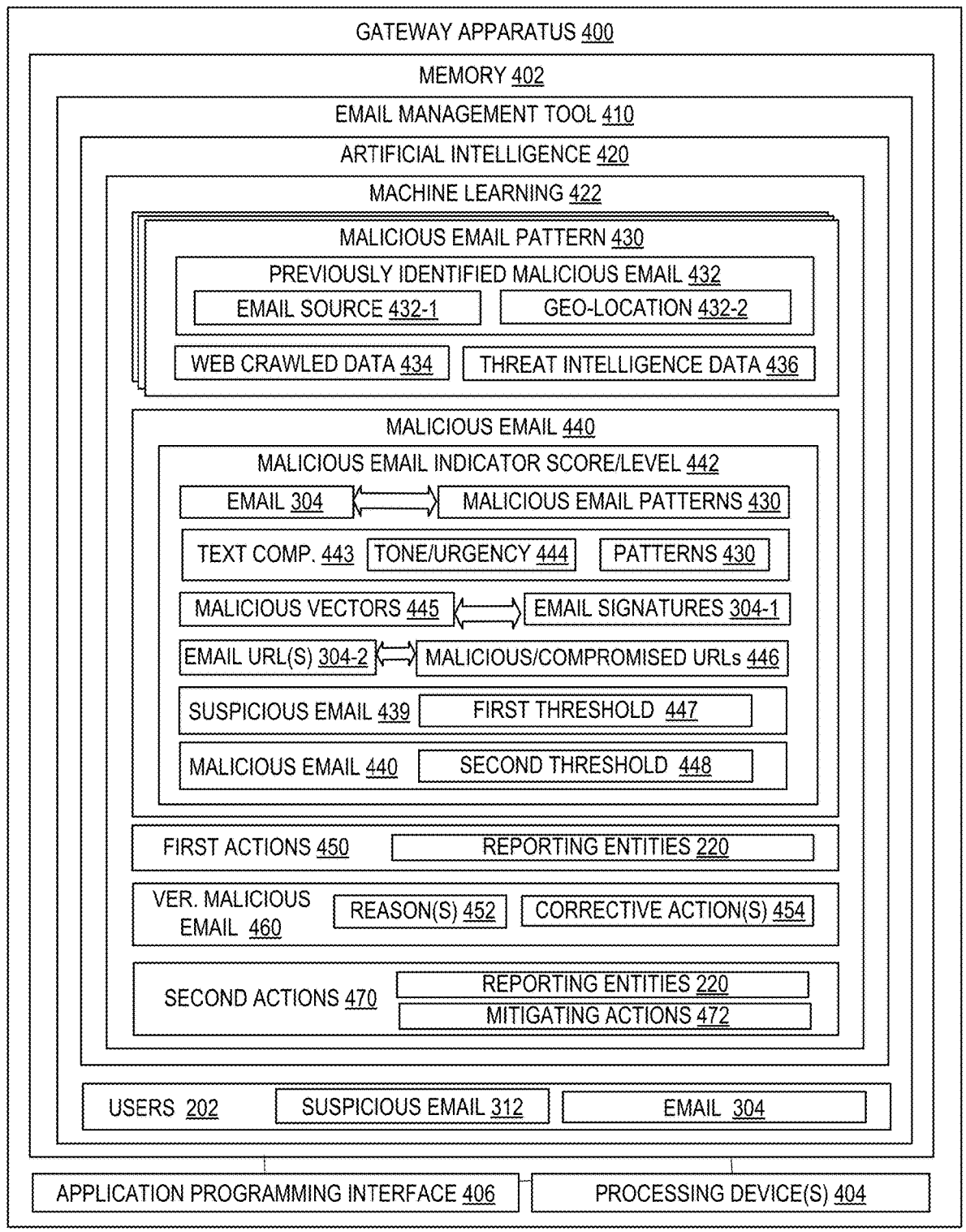
Figure 5:
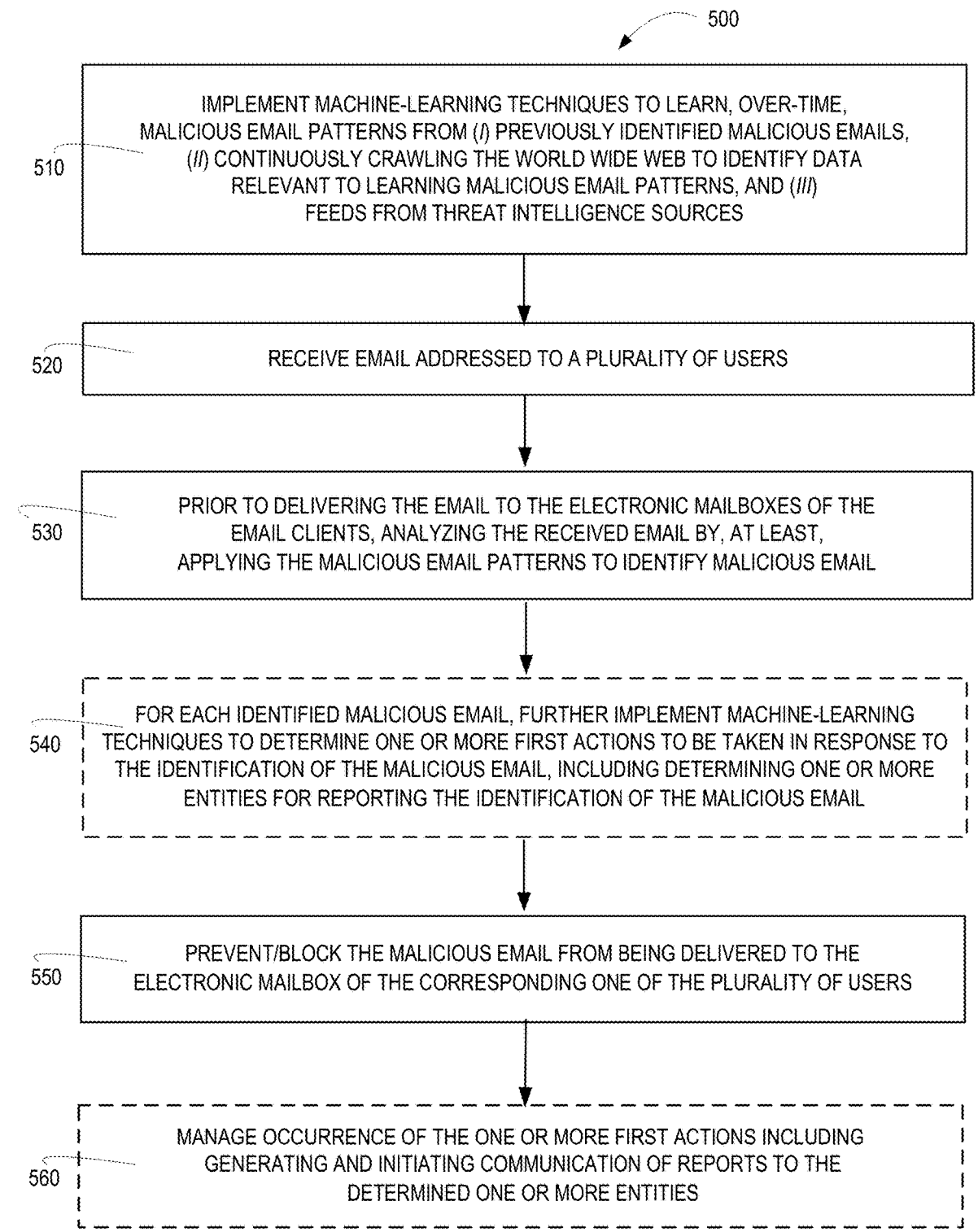

Having thus described embodiments of the disclosure in general terms, reference will now be made to the accompanying drawings, wherein:

FIG. 1 is a schematic diagram of a machine learning environment, in accordance with embodiments of the present invention;

FIG. 2 is a schematic/block diagram of a system for email management, in accordance with some embodiments of the present disclosure;

FIG. 3 is a schematic/block of an alternate system for email management, in accordance with embodiments of the present invention;

FIG. 4 is a block diagram of gateway apparatus configured for email management; in accordance with embodiments of the present invention;

FIG. 5 is a flow diagram of a method for email management, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed that implement Artificial Intelligence (AI), specifically Machine Learning (ML) techniques to identify malicious emails and prevent such emails from being delivered to the intended recipient's mailbox. In this regard, ML techniques are used to learn, over-time, malicious email patterns based at least one (i) previously identified malicious emails, including in some embodiments identifying the source and/or physical location of the previously identified malicious email, (ii) continuously crawling the Web to identify any data that is relevant to the identification of malicious email patterns, and (iii) feeds from threat intelligence sources. In specific embodiments of the invention, the analysis of the emails further includes comparing (i) any Universal resource Locators (URLs) embedded in the emails to known malicious or compromised locations and/or (ii) signatures (e.g., senders' address, Internet Protocol (IP) address, subject line and structure/format) of the received email to known malicious email vectors. In further specific embodiments of the invention, the analysis of the emails further includes comprehending text in the body of the email to determine the tone and/or urgency of the sender and/or identify a known malicious email pattern.

In specific embodiments of the analysis of emails to identity malicious emails provides for rendering a malicious email indicator score or level. In such embodiments of the invention, the controlling entity may define differing score thresholds to identify emails that are suspicious (i.e., unconfirmed as being malicious) or malicious. In this regard, a lower threshold may be set for identifying a suspicious email, which may be required to definitively determine whether or not the email is indeed malicious, while a higher threshold may be set for identifying a malicious email. In addition, the score thresholds are highly configurable such that controlling entities can adjust the thresholds on demand or for vary the thresholds for defined groups of email recipients.

In other specific embodiments of the invention, the ML techniques are relied upon to determine, for each identified malicious emails, the actions to be taken in terms of reporting, both internally and/or externally, the occurrence of the malicious email and mitigating further occurrences of the same or similar malicious emails. Moreover, the AI is able to manage the actions, including, but not limited to, generating and initiating communication of reports, retracting previously delivered similar or same emails and the like. Moreover, in those embodiments in which a malicious email indicator threshold is determined, the score thresholds may be determinative as to what actions are taken in response to identifying a suspicious or malicious email.

In additional specific embodiments of the invention, the email clients are configured with an add-on feature that allows for single user input (i.e., "one-click) reporting of emails received by a user that are perceived to be suspicious. The reporting of such email feeds directly back to the AL/ML where further analysis can be performed on such emails to definitively determine whether or not the suspicious email is a malicious email. If the email is determined to be malicious, the AI/ML may determine the necessity for further actions, such as determining who to report the malicious email to, if the email was delivered to other email recipient mailboxes, whether the recipient performed actions of the email, determining actions to be taken to ensure that further emails from the source are not received/delivered, actions to attempt to retract the same email from other email recipient mailboxes and the like. Moreover, if the email is determined to be malicious, the AI/ML may determine why the email was not initially determined to be malicious and implement steps to prevent such oversight in the future (i.e., self-correct).

As shown in FIG. 1, an exemplary machine learning subsystem architecture 100 is depicted in accordance with embodiments of the present invention. The machine learning subsystem 100 includes a data acquisition engine 102, data ingestion engine 110, data pre-processing engine 116, Machine learning (ML) model tuning engine 122, and inference engine 136.

The data acquisition engine 102 identifies various internal and/or external data sources to generate, test, and/or integrate new features for training the machine learning model 124. These internal and/or external data sources 104, 106, and 108 may be initial locations where the data originates or where physical information is first digitized. The data acquisition engine 102 may identify the location of the data and describe connection characteristics for access and retrieval of data. In some embodiments, data is transported from each data source 104, 106, or 108 using any applicable network protocols, such as the File Transfer Protocol (FTP), Hyper-Text Transfer Protocol (HTTP), or any of the myriad Application Programming Interfaces (APIs) provided by websites, networked applications, and other services. In specific embodiments of the present invention, external data sources may be any site on the public Internet or private Web (e.g., deep/dark Web) or the like that provides information on current threats or compromises and information that can assist in determining the source or physical location of a source of a malicious email. In other specific embodiments of the present invention, internal sources may be databases that store information pertaining to previously identified malicious emails or the like. The data acquired by the data acquisition engine 102 from these data sources 104, 106, and 108 is then transported to the data ingestion engine 110 for further pre-processing.

In machine learning, the quality of data and the useful information that can be derived therefrom directly affects the ability of the machine learning model 124 to learn. The data pre-processing engine 116 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 116 may implement feature extraction and/or selection techniques to generate training data 118. Feature extraction and/or selection is a process of dimensionality reduction by which an initial set of data is reduced to more manageable groups for processing. A characteristic of these large data sets is a large number of variables that require a high volume of computing resources to process. Feature extraction and/or selection may be used to select and/or combine variables into features, effectively reducing the amount of data that must be processed, while still accurately and completely describing the original data set.

Depending on the type of machine learning algorithm being used the training data 118 may require further enrichment. For example, in supervised learning, the training data 118 is enriched using one or more meaningful and informative labels to provide context so a machine learning model can learn from it. For example, in specific examples, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 122 may be used to train a machine learning model 124 using the training data 118 to make predictions or decisions without explicitly being programmed to do so. The machine learning model 124 represents what was learned by the selected machine learning algorithm(s) 120 and represents the rules, numbers, and any other algorithm-specific data structures required for classification. Selecting the right machine learning algorithm 120 depends on a number of different factors, such as, but not limited to, the problem statement and the kind of output needed; type and size of the data; the available computational time; number of features and observations in the data; and/or the like. Machine learning algorithms 120 may refer to programs (math and logic) that are configured to self-adjust and perform better in response to being exposed to more data. To this extent, machine learning algorithms 120 are capable of adjusting their own parameters, given feedback on previous performance in making prediction about a dataset.

The machine learning algorithms 120 contemplated, described, and/or used herein include supervised learning (e.g., using logistic regression, using back propagation neural networks, using random forests, decision trees, or the like), unsupervised learning (e.g., using an Apriori algorithm, using K-means clustering or the like), semi-supervised learning, reinforcement learning (e.g., using a Q-learning algorithm, using temporal difference learning), and/or any other suitable machine learning model type. Each of these types of machine learning algorithms 120 can implement any of one or more of a regression algorithm (e.g., ordinary least squares, logistic regression, stepwise regression, multivariate adaptive regression splines, locally estimated scatterplot smoothing, or the like), an instance-based method (e.g., k-nearest neighbor, learning vector quantization, self-organizing map, or the like), a regularization method (e.g., ridge regression, least absolute shrinkage and selection operator, elastic net, or the like), a decision tree learning method (e.g., classification and regression tree, iterative dichotomiser 3, C4.5, chi-squared automatic interaction detection, decision stump, random forest, multivariate adaptive regression splines, gradient boosting machines, or the like), a Bayesian method (e.g., naïve Bayes, averaged one-dependence estimators, Bayesian belief network, or the like), a kernel method (e.g., a support vector machine, a radial basis function, or the like), a clustering method (e.g., k-means clustering, expectation maximization, or the like), an associated rule learning algorithm (e.g., an Apriori algorithm, an Eclat algorithm, or the like), an artificial neural network model (e.g., a Perceptron method, a back-propagation method, a Hopfield network method, a self-organizing map method, a learning vector quantization method, or the like), a deep learning algorithm (e.g., a restricted Boltzmann machine, a deep belief network method, a convolution network method, a stacked auto-encoder method, or the like), a dimensionality reduction method (e.g., principal component analysis, partial least squares regression, Sammon mapping, multidimensional scaling, projection pursuit, or the like), an ensemble method (e.g., boosting, bootstrapped aggregation, AdaBoost, stacked generalization, gradient boosting machine method, random forest method, or the like), and/or the like.

To tune the machine learning model 124, the ML model tuning engine 122 may repeatedly execute cycles of experimentation/initialization 126, testing 128, and calibration 130 to optimize the performance of the machine learning algorithm 120 and refine the results in preparation for deployment of those results for consumption or decision making. To this end, the ML model tuning engine 122 may dynamically vary hyperparameters each iteration (e.g., number of trees in a tree-based algorithm or the value of alpha in a linear algorithm), run the algorithm on the data again, then compare the performance on a validation set to determine which set of hyperparameters results in the most accurate model. The accuracy of the ML model 124 is the measurement used to determine which set of hyperparameters is best at identifying relationships and patterns between variables in a dataset based on the input, or training data 118. A fully trained machine learning model 132 is one whose hyperparameters are tuned and model accuracy maximized.

The trained machine learning model 132, similar to any other software application output, can be persisted to storage, file, memory, or application, or looped back into the processing component to be reprocessed. More often, the trained machine learning model 132 is deployed into an existing production environment to make practical decisions based on live data 134, in this instance received emails. To this end, the machine learning subsystem 100 uses the inference engine 136 to make such decisions. The type of decision-making may depend upon the type of machine learning algorithm used. For example, trained machine learning models 132 trained using supervised learning algorithms may be used to structure computations in terms of categorized outputs (e.g., C_1, C_2 . . . C_n 138) or observations based on defined classifications, represent possible solutions to a decision based on certain conditions, model complex relationships between inputs and outputs to find patterns in data or capture a statistical structure among variables with unknown relationships, and/or the like. On the other hand, trained machine learning models 132 trained using unsupervised learning algorithms may be used to group (e.g., C_1, C_2 . . . C_n 138) live data 134 based on how similar they are to one another to solve exploratory challenges where little is known about the data, provide a description or label (e.g., C_1, C_2 . . . C_n 138) to live data 134, such as in classification, and/or the like. These categorized outputs, groups (clusters), or labels are then presented as output/results 140.

It will be understood that the embodiment of the machine learning subsystem 100 illustrated in FIG. 1 is exemplary and that other embodiments may vary. As another example, in some embodiments, the machine learning subsystem 100 may include more, fewer, or different components.

Referring to FIG. 2, a schematic/block diagram is presented of system 200 for email management, in accordance with embodiments of the present invention. The system includes a plurality of email clients 300. Each email client 300 is associated with one of a plurality of users 202 (i.e., email recipients) and each email client 300 includes an electronic mailbox 302 configured to allow a corresponding user 202 to access email 304 associated with one or more email accounts (i.e., email addresses) held by the corresponding user 202.

System 200 additionally includes gateway apparatus 400 that includes memory 410 and one or more processing devices 404 in communication with memory 402. Gateway apparatus 400 is disposed at an entry point for receiving email 304 from distributed communication network 210, which may include the Internet, one or more cellular networks or the like. Memory 402 of gateway apparatus 400 stores email management tool 410, which is executable by one or more of the processing device(s) 404. Email management tool 410 relies on Artificial Intelligence (AI) 420 and, more specifically Machine Learning (ML) 422 techniques, such as those discussed in relation to FIG. 1. In this regard, email management tool 410 is configured to implement machine learning to learn, over time, malicious email patterns 430 based, at least, on (i) previously identified malicious emails 432, (ii) continuously crawling the World Wide Web (WWW) (i.e., "the Web") to identify data (i.e., Web crawled data 434) relevant to learning malicious email patterns 430, and (iii) threat intelligence data 464 received on an ongoing basis from threat intelligence sources. A malicious email, as used herein, is any email that attempts to wrongfully obtain data from the user and/or the user's device (or a network in communication the user's device). Malicious email patterns 430 may be associated with the source of the emails (e.g., email address, Internet Protocol (IP) address, the physical location of the sender/source of the email, the content of the email (e.g., Universal Resource Locators, files or the like), the subject of the email, the format/structure of the email and the like.

Email management tool 410 is further configured to receive/intercept email 304 addressed to the plurality of users 202 and, prior to delivering the email 304 to the electronic mailboxes 302 of the email clients 300, implement ML 422 techniques to analyze the received email 304 by, at least, applying the malicious email patterns 430 to identify malicious email 440. In response to identifying malicious email 440, email management tool 410 is further configured to prevent/block the malicious email 440 from being delivered to the electronic mailbox 302 of the corresponding one of the plurality of users 202.

Referring to FIG. 3, a schematic/block diagram is presented of a system 200 for email management, in accordance with specific embodiments of the invention. In addition to providing greater details of the system 200, FIG. 3 highlights various alternate embodiments of the invention. Email management tool 410 is further configured to implement machine learning 422 techniques to determine, for each identified malicious email 440, one or more first actions 450. In this regard, the first actions 450 that are taken in response to identifying a malicious email 440 include actions that are specific to the type of malicious email 440 identified or other factors, such as the level of threat posed by the malicious email 440, the current threat level state and the like. In specific embodiments of the invention, ML 422 techniques determine the one or more actions 450 based on previous actions taken in response to previously identified malicious email 432. First actions 450 may include, but are not limited to, determining/identifying which entities, both internal and external (i.e., reporting entities 220) to report the identification of the malicious email. In addition, the email management tool 410 is configured to manage the occurrence of the first actions 450, such as generating and initiating communication of the reporting notifications to the internal and/or external reporting entities 220.

Due to configurable levels of malicious email threat tolerance (which will be discussed infra, in relation to FIG. 4), the email management tool 410 may not be foolproof, and thus, according to specific embodiments of the invention, email clients 300 are configured to include an email reporting add-on 310 feature that is configured to allow for a single user input for reporting, to the email management tool 410, an email 304 that the corresponding user 202 identifies as a suspicious email 312. A suspicious email 312 is an email that the user 202 perceives to be attempting to wrongfully obtain data from the user 202 or the user's device/network. In response to the reporting of the suspicious email 312 to the email management tool 410, the email management tool 410 is further configured to further analyze the suspicious email 312 to determine whether the suspicious email 312 is a verified malicious email 460.

In response to the email management tool 410 determining that the suspicious email 312 is a verified malicious email 460, the email management tool 410 is further configured to implement machine learning 422 techniques to determine one or more reasons 452 why the verified malicious email 460 was not identified as malicious email prior to communicating the email 304 to the electronic mailbox 302 of the email client 300. In responses to determining the one or more reasons 452 why the malicious email 440 was not identified as malicious email the email management tool 410 is further configured to implement machine learning 422 techniques to at least attempt to correct the machine learning models (i.e., corrective actions 454) so that subsequent received malicious email 440 is not delivered to the electronic mailbox 302 of the email client 300 associated with the user.

In addition, in response to the email management tool 410 determining that the suspicious email 312 is a verified malicious email 460, the email management tool 410 is further configured to implement ML 422 techniques to determine one or more second actions 470 actions 450 based on previous actions taken in response to previously determined verified malicious email 460. Second actions 470 may include, but are not limited to, determining/identifying which entities, both internal and external (i.e., reporting entities 220) to report the identification of the malicious email and mitigating actions 472 to limit the threat posed by the verified malicious email 460. For example, the mitigating actions 472 may include determining which other users 202 received emails with similar or same signatures as the verified malicious email 460 and, in response, (i) determining which users performed an action on the email (i.e., open the email, opened a file attached to the email, activated a hyperlink or the like) in response to receiving the similar or same email and (ii) at least attempting to replace the similar or same emails with a notification that indicates that the email is being permanently or temporarily retracted or quarantined until further analysis can be performed on the similar email to determine whether the retracted similar email is a malicious email. In addition, the email management tool 410 is configured to manage the occurrence of the second actions 470, such as generating and initiating communication of the reporting notifications to the internal and/or external reporting entities 220 and taking the necessary mitigation actions 472 (i.e., retracting email, generating and initiating communication of retraction/quarantine notifications and the like).

Referring to FIG. 4, a block diagram is presented of a gateway apparatus configured for email management, in accordance with embodiments of the present invention. In addition to providing greater details of the gateway apparatus 400, FIG. 4 highlights various alternate embodiments of the invention. Gateway apparatus 400 may comprise one or multiple devices, such as servers, storage devices and the like that are in wired and/or wireless communication with one another. Gateway apparatus 400 includes memory 402, which may comprise volatile and non-volatile memory, such as read-only and/or random-access memory (RAM and ROM), EPROM, EEPROM, flash cards, or any memory common to computing platforms). Moreover, memory 402 may comprise cloud storage, such as provided by a cloud storage service and/or a cloud connection service.

Further, gateway apparatus 400 also includes one or more processing devices 404, which may be an application-specific integrated circuit ("ASIC"), or other chipset, logic circuit, or other data processing device. Processing device(s) 404 may execute one or more application programming interface (APIs) 406 that interface with any resident programs, such as user email management tool 410 or the like, stored in memory 402 of gateway apparatus 400 and any external programs. Processing devices(s) 404 may include various processing subsystems (not shown in FIG. 4) embodied in hardware, firmware, software, and combinations thereof, that enable the functionality of gateway apparatus 400 and the operability of gateway apparatus 400 on a communications network, such as the Intranet, cellular network(s) and the like. For example, processing subsystems allow for initiating and maintaining communications and exchanging data with other networked devices. For the disclosed aspects, processing subsystems of gateway apparatus 400 may include any subsystem used in conjunction with email management tool 410 and related tools, routines, sub-routines, algorithms, sub-algorithms, sub-modules thereof.

In specific embodiments of the present invention, gateway apparatus 400 additionally includes a communications module (not shown in FIG. 4) embodied in hardware, firmware, software, and combinations thereof, that enables electronic communications between the Gateway apparatus 400 and other networks and network devices, such as user devices storing or having access to email client 300 and the like. Thus, communication module may include the requisite hardware, firmware, software and/or combinations thereof for establishing and maintaining a network communication connection with one or more devices and/or networks.

Memory 502 of gateway apparatus 400 stores email management tool 410 that is artificial intelligence (AI)-based, including machine learning (ML) techniques. Email management tool 410 is configured to detect/identify malicious email and, in response, (i) determine and perform actions including identifying reporting entities and generating and communicating the reports, and (ii) block/prevent the email from electronic mailbox delivery.

In this regard, email management tool 410 is configured to implement machine learning to learn, over time, malicious email patterns 430 based, at least, on (i) previously identified malicious emails 432 including the source 432-1 and the geo-location (e.g., country) of the previously identified malicious emails 432, (ii) continuously crawling the World Wide Web (WWW) (i.e., "the Web") to identify data (i.e., Web crawled data 434) relevant to learning malicious email patterns 430, and (iii) threat intelligence data 464 received on an ongoing basis from threat intelligence sources (e.g., subscription services or the like) As previously discussed, malicious email patterns 430 may be associated with the source of the emails (e.g., email address, Internet Protocol (IP) address, the physical location of the sender/source of the email, the content of the email (e.g., Universal Resource Locators, files or the like), the subject of the email, the format/structure of the email and the like.

Email management tool 410 is further configured to receive/intercept email 304 addressed to the plurality of users 202 and, prior to delivering the email 304 to the electronic mailboxes 302 of the email clients 300, implement ML 422 techniques to analyze the received email 304 by, at least, applying the malicious email patterns 430 to identify malicious email 440. In specific embodiments of the invention, ML 422 techniques are further implemented to analyze the received emails by identifying email signatures (e.g., sender's address, IP address, subject line, format/structure) and comparing the email signatures 304-1 to known/emerging malicious email vectors 445. In other embodiments of the invention, analyzing the received emails 304 further includes text comprehension 443, whereby the body of the email is comprehended, i.e., "read", for purposes of understanding the tone and/or urgency 444 and/or identifying known malicious email patterns 430 within the body of the email. In still further specific embodiments of the invention, analysis of the received emails 304 includes comparing any URL(s) 304-2 embedded in the received emails 304 to known malicious and/or compromised URLs 446/network locations.

In specific embodiments of the invention, the analysis of the received emails 304 results in determination of a malicious email indicator score 442 that indicates a level of malicious email factors attributable to an email. The score 442 may be based on one or more of the individual analysis techniques discussed above. Score thresholds are set to identify malicious emails. In specific embodiments of the invention a first threshold 447 is set to identify a suspicious email that warrants further analysis to determine whether or not the email is malicious, and s second threshold 448 is set to determine that an email is malicious. The various thresholds that are set are highly configurable by the entity in control of the email management tool 410 and may include different thresholds for different users (e.g., LOBs, divisions, job titles/classifications within the entity) depending on the threat level for malicious email that the users can tolerate. In additional embodiments of the invention, the thresholds may vary, in some instances dynamically, overtime as threats emerge or based on periods of low or high malicious email threats.

As previously discussed, email management tool 410 is further configured to implement machine learning 422 techniques to determine, for each identified malicious email 440, one or more first actions 450. In this regard, the first actions 450, which are taken in response to identifying a malicious email 440, include actions that are specific to the type of malicious email 440 identified or other factors, such as the level of threat posed by the malicious email 440, the current threat level state and the like. In specific embodiments of the invention, ML 422 techniques determine the one or more actions 450 based on previous actions taken in response to previously identified malicious email 432. First actions 450 may include, but are not limited to, determining/identifying which entities, both internal and external (i.e., reporting entities 220) to report the identification of the malicious email. In addition, the email management tool 410 is configured to manage the occurrence of the first actions 450, such as generating and initiating communication of the reporting notifications to the internal and/or external reporting entities 220. Further, in response to identifying malicious email 440, email management tool 410 is further configured to prevent/block the malicious email 440 from being delivered to the electronic mailbox 302 of the corresponding one of the plurality of users 202.

In response to the reporting of the suspicious email 312 to the email management tool 410 by the add-feature 310 of the email clients 300 (see, FIG. 3), the email management tool 410 is further configured to further analyze the suspicious email 312 to determine whether the suspicious email 312 is a verified malicious email 460. In response to the email management tool 410 determining that the suspicious email 312 is a verified malicious email 460, the email management tool 410 is further configured to implement machine learning 422 techniques to determine one or more reasons 452 why the verified malicious email 460 was not identified as malicious email prior to communicating the email 304 to the electronic mailbox 302 of the email client 300. In responses to determining the one or more reasons 452 why the malicious email 440 was not identified as malicious email the email management tool 410 (or if not reason(s) can be determined) is further configured to implement machine learning 422 techniques to at least attempt to correct the machine learning models (i.e., corrective actions 454) so that subsequent received malicious email 440 is not delivered to the electronic mailbox 302 of the email client 300 associated with the user.

In addition, in response to the email management tool 410 determining that the suspicious email 312 is a verified malicious email 460, the email management tool 410 is further configured to implement ML 422 techniques to determine one or more second actions 470 actions 450 based on previous actions taken in response to previously determined verified malicious email 460. Second actions 470 may include, but are not limited to, determining/identifying which entities, both internal and external (i.e., reporting entities 220) to report the identification of the malicious email and mitigating actions 472 to limit the threat posed by the verified malicious email 460. For example, the mitigating actions 472 may include determining which other users 202 received emails with similar or same signatures as the verified malicious email 460 and, in response, (i) determining which users performed an action on the email (i.e., open the email, opened a file attached to the email, activated a hyperlink or the like) in response to receiving the similar or same email and (ii) at least attempting to replace the similar or same emails with a notification that indicates that the email is being permanently or temporarily retracted or quarantined until further analysis can be performed on the similar email to determine whether the retracted similar email is a malicious email. In addition, the email management tool 410 is configured to manage the occurrence of the second actions 470, such as generating and initiating communication of the reporting notifications to the internal and/or external reporting entities 220 and taking the necessary mitigation actions 472 (i.e., retracting email, generating and initiating communication of retraction/quarantine notifications and the like).

Referring to FIG. 5, a flow diagram is presented of a method 500 for email management, in accordance with embodiments of the present invention. At Event 510, machine learning techniques are implemented to learn, over time, malicious email patterns based, at least, on, (i) previously identified malicious emails (i.e., data fed back into the machine learning models) including the source of the previously identified malicious emails and/or the geo-location of the sender of the previously identified malicious emails, (ii) continuously crawling the Web (e.g., Dark web, message boards and the like) for relevant malicious email data, and (iii) data feeds received from threat intelligence sources (e.g., subscription services and the like).

At Event 520, email is received addressed to a plurality of users (i.e., email recipients having email accounts associated with the entity managing the email or the like). In response to receiving the email and prior to delivering the email to the mailbox of the users/email recipients, at Event 530, the received email is analyzed to identify malicious email (i.e., email that is attempting to wrongfully obtain data from the user and/or the user's device/network). In specific embodiments of the method, such analysis includes, but is not limited to, applying the malicious email patterns to the received email to determine if matches exist. In other embodiments of the method, such analysis may include comprehending the text in the body of the email to determine the tone and/or urgency of the sender or determine if the text matches known malicious email patterns. In other embodiments of the method, URLs embedded in the email are compared to known malicious or compromised network locations. In other specific embodiments of the method, the analysis results in a malicious email indicator score, which is then compared to predetermined or dynamically set thresholds to determine if the email is suspicious (requiring further analysis to confirm whether or not the email is malicious) or determine if the email is malicious. Such thresholds are highly configurable by the entity in control of the email management methodology.

At optional Event 540, for each identified malicious email, further ML techniques are implemented to determine one or more actions to be taken in response to identification of a corresponding malicious email. The actions may include, but are not limited to, identifying the reporting entities (i.e., the entities to whom the malicious should be reported to) both internal entities and/or external entities (i.e., ISPs, government agencies and the like).

At Event 550, the malicious email are prevented/blocked from being delivered to the electronic mailbox of the corresponding user/email recipient. In alternate embodiments of the method, malicious content (e.g., URLs or the like) are removed from the email or deactivated and, subsequently, the email is communicated to the user/email recipient.

At optional Event 560, the occurrence of the actions is managed including generating and initiating communication of the reports/notifications to the previously identified reporting entities.

Thus, present embodiments of the invention provide for implementing machine learning (ML) techniques to identify malicious emails and, in response, identifying and conducting actions, including reporting the malicious emails to identified internal and/or external entities and preventing the malicious emails from being delivered to email client mailboxes. The ML techniques rely on malicious email patterns identified from previously identified malicious emails and data resulting from continuously crawling the Web and known threat intelligence sources. Further embodiments of the invention provide for the email clients to include an add-on feature in which the user can provide a single input to report the email as being suspicious, which results in further analysis to determine whether the email is, in fact, a malicious email. In response to determining that a reported suspicious email is malicious, the AI/ML is implemented to determine why the email initially was delivered to the email recipient and provides corrective actions to eliminate or less the possibility of future similar oversights.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein

What is claimed is:

1. A system for electronic mail (email) management, the system comprising:
   a plurality of email clients, each email client associated with one of a plurality of users and including an electronic mailbox configured to allow a corresponding one of the plurality of users to access email associated with one or more email accounts held by the corresponding user; and
   a gateway apparatus having a memory and one or more processing devices in communication with the memory, wherein the memory stores an artificial intelligence-based email management tool that implements machine learning, is executable by at least one of the processing devices and configured to:
      learn, over-time, malicious email patterns from (i) malicious emails previously identified by the email management tool, (ii) continuously crawling the World Wide Web to identify data relevant to learning malicious email patterns, and (iii) feeds from threat intelligence sources,
      receive email addressed to the plurality of users,
      prior to delivering the email to the electronic mailboxes of the email clients, analyze the received email by, at least, applying the malicious email patterns to identify malicious email, wherein malicious email is email that attempts to wrongfully obtain data, and
      prevent the malicious email from being delivered to the electronic mailbox of the corresponding one of the plurality of users, and
   wherein the plurality of email clients are configured with an email reporting add-on feature that is configured to allow for a single user input for reporting an email to the email management tool that the corresponding user identifies as a suspicious email, wherein the email was previously analyzed by the email management tool and was delivered to the electronic mailbox of the email client, wherein suspicious email is email that the email recipient perceives to be attempting to wrongfully obtain data from the email recipient,
   wherein, upon receipt of the suspicious email, the email management tool is configured to:
   implement machine learning techniques to further analyze the suspicious email to determine whether the suspicious email is a verified malicious email,
   in response to determining that the suspicious email is a verified malicious email, implement machine learning techniques to determine one or more reasons why the verified malicious email was not identified by the email management tool as malicious prior to communicating the email to the electronic mailbox of the email client.

2. The system of claim 1, wherein the email management tool is further configured to:
   for each identified malicious email, determine one or more first actions to be taken in response to the identification of the malicious email, wherein the one or more first actions include determining one or more entities for reporting the identification of the malicious email, and manage occurrence of the one or more first actions including generating and initiating communication of reports to the determined one or more entities.

3. The system of claim 1, wherein the email management tool is further configured to implement machine learning techniques to determine one or more second actions to be taken in response to determining that the identified suspicious email is the verified malicious email, wherein the one or more second actions include at least one of determining one or more entities for reporting the identification of the suspicious email.

4. The system of claim 3, wherein the one or more second actions include, in response to determining which other electronic mailboxes received emails with similar signatures to the verified malicious email, attempting to replace the emails determined to have similar signatures with an email notification that indicates that the emails determined to have similar signatures are being held for further analysis.

5. The system of claim 1, wherein email management tool is further configured to the analyze the received email to determine whether received email are suspicious email and, in response to determining that one or more email are suspicious email, conduct additional analysis to determine whether the suspicious email are malicious email, wherein suspicious email is email that may be attempting to wrongfully obtain data from the email recipient.

6. The system of claim 1, wherein the email management tool is further configured to analyze the received email by comparing any Universal Resource Locators (URLs) embedded in the email to known malicious or compromised locations.

7. The system of claim 1, wherein the email management tool is further configured to analyze the received email by comparing signatures of a received email to known malicious email vectors, wherein the signatures include email sender address, Internet Protocol (IP) address, subject line, and structure or format of the email.

8. The system of claim 1, wherein the email management tool is further configured to analyze the received email by comprehending text of a body of the received email to determine at least one of a tone or an urgency of a sender of the received email.

9. The system of claim 1, wherein the email management tool is further configured to analyze the received email by comprehending text of a body of the received email to identify at least one of the known malicious email patterns.

10. The system of claim 1, wherein the email management tool is further configured to learn, over-time, malicious email patterns by determining at least one of a source and physical location of the source of the malicious emails previously identified by the email management tool.

11. The system of claim 2, wherein the email management tool is further configured to manage occurrence of the one or more first actions, wherein the one or more first actions include at least one of (i) feeding data associated with the malicious email back into the email management tool, and (ii) blocking future emails from the sender from being received at the gateway apparatus.

12. The system of claim 1, wherein the email management tool is further configured to analyze the received email to determine a malicious email indicator score, wherein the malicious email indicator score is used to identify received emails as malicious emails.

13. The system of claim 12, wherein the email management tool is further configured to determine one or more first actions to be taken in response to the identification of the malicious email based on the malicious email indicator score.

14. The system of claim 12, wherein the email management tool is further configured to determine whether received email are suspicious email based on the malicious email indicator score and, in response to determining that one or more email are suspicious email, conduct additional analysis to determine whether the suspicious email are malicious email, wherein suspicious email is email that may be attempting to wrongfully obtain data from the email recipient.

* * * * *